United States Patent [19]

Mills

[11] 3,988,293
[45] Oct. 26, 1976

[54] STABILIZER SYSTEM FOR POLYOLEFINS

[75] Inventor: Kenneth R. Mills, Bartlesville, Okla.

[73] Assignee: Phillips Petroleum Company, Bartlesville, Okla.

[22] Filed: May 28, 1975

[21] Appl. No.: 581,516

Related U.S. Application Data

[63] Continuation-in-part of Ser. No. 216,296, Jan. 7, 1972, abandoned.

[52] U.S. Cl. ............... 260/45.8 R; 260/45.95 F
[51] Int. Cl.² ................................... C08K 5/32
[58] Field of Search .............. 260/45.8 R, 45.95 F

[56] References Cited

UNITED STATES PATENTS

| | | | |
|---|---|---|---|
| 3,039,993 | 6/1962 | Friedman | 260/45.7 |
| 3,188,298 | 6/1965 | Williamson et al. | 260/45.85 |
| 3,285,855 | 11/1966 | Dexter et al. | 260/45.85 |
| 3,737,485 | 6/1973 | Hechenbleikner | 260/45.8 R |

OTHER PUBLICATIONS

Advances in Chemistry Series, ACS Publications 1968, pp. 208 to 209.
Crystalline Olefin Polymers, Part II, Raff et al., 1964, pp. 363 to 379.

*Primary Examiner*—V. P. Hoke

[57] ABSTRACT

The addition of a minor amount of distearyl pentaerythritol diphosphite to olefin polymers containing 2-hydroxy-4-n-octoxybenzophenone as the ultraviolet stabilizer increases the ultraviolet resistance of the polyolefins. Olefin polymers containing these stabilizers can be used in the production of items that will be brought into contact with food products.

9 Claims, No Drawings

STABILIZER SYSTEM FOR POLYOLEFINS

This is a continuation in part application of my copending application having Ser. No. 216,296, filed on Jan. 7, 1972 now abandoned.

BACKGROUND OF THE INVENTION

This invention relates to stabilized polymers. More particularly, it relates to the stabilization of monoolefin polymers against deterioration in physical properties resulting from exposure to ultraviolet light. In one of its aspects, the invention relates to stabilized polymers suitable for use in the production of items in which the stabilized polymer contacts food products. In another of its aspects, the invention relates to the improvement of stabilization of olefin polymers compositions against deterioration in physical properties resulting from exposure to ultraviolet light using multi-component stabilizing compositions.

In recent years, polymers of monoolefins have found extensive use in the preparation of a wide variety of manufactured products many of which are brought into contact with food products. It is well known that exposure to sunlight or other sources of ultraviolet radiation cause a degradation of olefin polymers which is evidenced by a loss in molecular weight of the polymer, a darkening in color, and a decrease in such physical properties as tensile strength to the point that mechanical failure can occur. A variety of stabilizers are used in the prior art to provide protection against deterioration of monoolefin polymers on exposure to ultraviolet radiation. Most of these stabilizers have not been approved by the Food and Drug Administration for use where there will be contact of the olefin polymer with a food product.

I have found that the stabilizing effect of an ultraviolet stabilizing compound approved for use with food products by the Food and Drug Administration can be enhanced by its use in combination with another stabilizing compound which also has Food and Drug Administration approval for use with food products.

It is therefore an object of this invention to provide a stabilizing composition of improved effectiveness for use in combatting the deterioration of monoolefin polymers on exposure to ultraviolet radiation. It is also an object of this invention to provide a stabilizing composition which has approval from the Food and Drug Administration for use with food products.

SUMMARY OF THE INVENTION

According to the invention 2-hydroxy-4-n-octoxybenzophenone and distearyl pentaerythritol diphosphite are each added in a stabilizing amount to a polymer of a monoolefin to provide an olefin polymer stabilized against deterioration in the presence of ultraviolet radiation which polymer can be used in products which contact foodstuffs.

In one of the embodiments of the invention thermal stabilizing compositions which have approval of the Food and Drug Administration for use with foodstuffs can also be added to the olefin polymer.

The ultraviolet stabilizer, 2-hydroxy-4-n-octoxybenzophenone, is used at customary levels for olefin polymer stabilization. These levels are in the range of 0.2 to 4 parts stabilizer per hundred parts of polymer. A preferred range of ultraviolet stabilizer addition is in the range of about 0.4 to 1.5 parts stabilizer per hundred parts of polymer.

It is desirable to use a minimum amount of the phosphite, distearyl pentaerythritol disphosphite, to aid in the stabilizing system. The broad range for addition of the phosphite is about 0.01 to about 0.5 parts phosphite per hundred parts of polymer. The most favorable amount is about 0.1 parts of phosphite per hundred parts of polymer.

Thermal stabilizers which have been approved by the Food and Drug Administration for use with olefin polymers for contact with foodstuffs include among others dilaurylthiodipropionate (DLTDP), tetrakis[methylene(3,5-di-t-butyl-4-hydroxyhydrocinnamate)]methane (Irganox 1010), distearylthiodipropionate (DSTDP), 2,6-di-t-butyl-4-methylphenol (BHT), and 1,1,3-tris(2-methyl-4-hydroxy-5-t-butylphenyl)butane (Topanol CA). These stabilizers are used in amounts ranging from 0.005 to 2.0 parts of stabilizer per hundred parts of polymer. In many olefin polymer compositions, it is conventional to use about 0.02 to about 0.1 parts of stabilizer per hundred parts of polymer of a primary phenolic stabilizer and a somewhat large amount of one of the propionates mentioned. The amount of propionates can range from about 0.05 to about 0.5 parts of stabilizer per hundred parts of polymer. One or more of the thermal stabilizers can be used in conjunction with the ultraviolet stabilizing composition of this invention.

The olefin polymers for which these stabilizers are useful include homopolymers and copolymers of monoolefins containing 2 to 8 carbon atoms per molecule.

The stabilizing compounds are added to the olefin polymers in any conventional manner. This includes dry blending or spraying solutions of the ingredients with resin powder or pellets followed by melt blending of the mixture in an extruder, on a roll mill, in a Banbury mixer and the like. Addition of the additives to the polymer melt followed by mixing process can also be practiced.

Other additives including fillers, pigments, antistatic agents and the like can also be added to the olefin polymer. To obtain the greatest advantage of the invention, however, all additives should have approval from the Food and Drug Administration for use in the presence of foodstuffs.

The olefin polymer compositions protected by the stabilizing compositions of this invention can be converted by extrusion, injection molding, blow molding and the like into a variety of molded objects, filaments, films, sheets, and so forth. It is most advantageous to convert the compositions into clear, strong oriented articles such as biaxially oriented polypropylene bottles and film.

EXAMPLE I

Chill-roll film was prepared by extruding a polypropylene melt in either flat or tubular form and quenching the extrudate immediately on water cooled rolls. This is a conventional method of forming film, particularly polypropylene film, since a clear product is formed. The polypropylene used in preparing the film had a melt flow of about 3 as determined by test procedure ASTM D-1238-62T, condition L and an optically determined melting point of about 340° F. as determined by test procedure ASTM D-2117-64. The additives noted in the runs in Table I were added to the polymer in each instance by mixing 500 grams of an acetone solution or slurry containing the additives with 2000 grams of the polymer and evaporating the solvent. Sample specimens were prepared from the chill-roll film thus produced. The samples were about 2.5 mils thick and had approximate dimensions of three-eighths inch wide by 1½ inches long. These samples were exposed in an Atlas Model XW Weather-Ometer until they broke upon being flexed about 180°. Table I below shows the results of this experiment.

185° C. under nitrogen for 10 minutes at a rotor speed of 50 RPM. Film was compression molded from each blend at 425° F. and test specimens measuring three-eighths inch wide by 1½ inches long were cut from each film. The specimens were exposed in an Atlas Xenon lamp Weather-Ometer until they broke upon being flexed about 180°. The results are presented in Table II.

TABLE I

| Run | BHT | DLTDP | Irganox[a] 1010 | Cyasorb[b] 531 | Test UV Stabilization Additive | Hours to Breaking in XW Weather-Ometer |
|-----|-----|-------|-----------------|----------------|--------------------------------|----------------------------------------|
| A | — | 0.40 | 0.06 | 0.50 | None | 300 |
| B | 0.10 | 0.20 | 0.06 | 0.50 | None | 317 |
| C | — | — | 0.06 | 0.50 | None | 317 |
| D | — | — | 0.06 | 0.50 | 0.20 distearylthiodipropionate | 317 |
| E | — | 0.20 | — | 0.50 | 0.06[c] | 317 |
| F | — | 0.20 | 0.06 | 0.50 | 0.10[d] | 350 |
| G | — | 0.20 | 0.06 | 0.50 | 0.10 tris nonylphenyl phosphite | 366 |
| H | — | 0.20 | 0.06 | 0.50 | 0.10[e] | 366 |
| I | — | 0.20 | 0.06 | 0.50 | 0.10 dioctyl phoshite | 366 |
| J | — | 0.20 | 0.06 | 0.50 | 0.10[f] | 366 |
| K | — | 0.20 | 0.06 | 0.50 | 0.10 triphenyl phosphite | 366 |
| L | — | 0.20 | — | 0.50 | 0.06 as Run E plus 0.1 dioctyl phosphite | 366 |
| M | 0.07 | — | 0.08 | 0.62 | 0.24 distearylthiodipropionate | 366 |
| N | — | 0.20 | 0.06 | 0.50 | 0.10[g] | 366 |
| O | — | 0.20 | 0.06 | 0.50 | 0.50[b] | 366 |
| P | — | 0.20 | 0.06 | 0.50 | 0.10 distearyl pentaerythritol diphosphite | 432 |

[a]Tetrakis[methylene(3,5-di-t-butyl-4-hydrohydrocinnamate]methane.
[b]2-Hydroxy-4-n-octoxybenzophenone.
[c]di-n-octadecyl(3,5-di-t-butyl-4-hydroxybenzyl) phosphonate.
[d]Reaction product of hydrogenated bisphenol A and pentaerythritol phosphite according to U.S. Patent 3,053,878. (Weston 442 Phosphite, a product of Weston Chemical, Inc.).
[e]Reaction product of hydrogenated bisphenol A and triphenyl phosphite according to U.S. Patents 3,341,629 and 3,392,032. (Weston 243-B Phosphite, a product of Weston Chemical, Inc.).
[f]Reaction product of bisphenol A and pentaerythritol phosphite according to U.S. Patent 3,053,878. (Weston 1620 Phosphite, a product of Weston Chemical, Inc.).
[g]Tetrakis (nonylphenyl)propyleneglycol 425 diphosphite (Weston 425 Phosphite, a product of Weston Chemical, Inc.).

Table I points out that the addition of distearyl pentaerythritol diphosphate to an ultraviolet stabilized olefin polymer composition containing 2-hydroxy-4-n-octoxybenzophenone enhances the physical properties of the stabilized composition as compared to combinations of various other additives. This is shown by comparing Run P with control Runs A and B wherein a stabilized composition with distearyl pentaerythritol diphosphite is compared to the composition with the same other additives without distearyl pentaerythritol diphosphite. None of the runs C-O using other additives in a combination of stabilizing compounds which contains 2-hydroxy-4-n-octoxybenzophenone is as effective as the combination containing the distearyl pentaerythritol diphosphite. This combination of ingredients has the added advantage of both components being approved by the Food and Drug Administration for use with foodstuffs. The table also shows the use of the distearyl pentaerythritol diphosphite and 2-hydroxy-4-n-octoxybenzophenone in combination with other commonly used thermal stabilizers.

EXAMPLE II

Individual portions of polypropylene powder characterized by a melt flow of 3.6 as determined by test procedure ASTM D-1238-62T, Condition L, and an optically determined melting pont of about 340° F. as determined by test procedure ASTM D-2117-64 were mixed with the quantities of additives shown in Table II. Each additive is listed in parts by weight per 100 parts by weight polymer. The mixing procedure consisted of mixing each portion of polymer with an acetone solution or slurry of the additives used. After the solvent was evaporated a 37 gram portion of the composite was melt blended in a Brabender Plastograph at

TABLE II

Results of Testing 2.5 Mil Thick Film Samples

| Run | DLTDP | Irganox 1010 | Cyasorb 531 | Phosphite | Hours To Breaking |
|-----|-------|--------------|-------------|-----------|-------------------|
| Q | 0.2 | 0 | 0.5 | 0 | —[a] |
| R | 0.2 | 0 | 0 | 0.1 | 473 |
| S | 0 | 0.06 | 0 | 0.1 | 376 |
| T | 0.2 | 0.06 | 0 | 0.1 | 497 |
| U | 0.2 | 0.06 | 0.5 | 0.1 | —[a] |

Notes:
The additives DLTDP, Irganox 1010 and Cyasorb are described in footnotes of Table I.
The phosphite is distearyl pentaerythritol diphosphite.
[a]Samples had not failed after 636 hours.

The results in Table II show that the invention run (Run U) gave better polymer stabilization than Runs R, S and T.

Reasonable variation and modification are possible within the scope of the foregong disclosure and the appended claims the essence of which is that the combination of 2-hydroxy-4-n-octoxybenzophenone and distearyl pentaerythritol diphosphite added in a stabilizing amount to an olefin polymer provides enhanced stabilization of the olefin polymer in the presence of ultraviolet radiation and also provides a stabilized polymer which has Food and Drug Administration approval for use in products that will be contacted with foodstuffs.

I claim:
1. A method for stabilizing an olefin polymer against deterioration in the presence of ultraviolet radiation which comprises the addition of a stabilizing amount of 2-hydroxy-4-n-octoxybenzophenone in combination with a stabilizing amount of distearyl pentaerythritol diphosphite.

2. The method of claim 1 wherein the 2-hydroxy-4-n-octoxybenzophenone is added in an amount in the range of about 0.2 to about 4 parts stabilizer per hundred parts of polymer and the distearyl pentaerythritol diphosphite is added in an amount in the range of about 0.01 to about 0.5 parts phosphite per hundred parts of polymer.

3. The method of claim 1 wherein the 2-hydroxy-4-n-octoxybenzophenone is added in an amount in the range of about 0.4 to about 1.5 parts stabilizer per hundred parts of polymer and the distearyl pentaerythritol diphosphite is added in an amount of about 0.1 parts per hundred parts of polymer.

4. A composition of matter stabilized against deterioration in the presence of ultraviolet radiation comprising an olefin polymer and a stabilizing amount of 2-hydroxy-4-n-octoxybenzophenone in combination with a stabilizing amount of distearyl pentaerythritol diphosphite.

5. The stabilized composition of claim 4 wherein the olefin polymer is chosen from the group consisting of homopolymers and copolymers of monoolefins containing 2 to 8 carbon atoms per molecule.

6. The stabilized composition of claim 4 wherein the composition contains in the range of about 0.2 to about 4 parts 2-hydroxy-4-n-octoxybenzophenone per hundred parts of polymer and about 0.01 to about 0.5 parts distearyl pentaerythritol diphosphite per hundred parts of polymer.

7. The stabilized composition of claim 4 wherein the composition contains in the range of about 0.4 to about 1.5 parts 2-hydroxy-4-n-octoxy-benzophenone per hundred parts of polymer and about 0.1 parts distearyl pentaerythritol diphosphite per hundred parts of polymer.

8. The method of claim 1 comprising the addition of stabilizing amounts of dilaurylthiodipropionate and tetrakis[methylene(3,5-di-t-butyl-4-hydroxyhydrocinnamate)]methane.

9. A stabilized composition of matter of claim 4 comprising a stabilizing amount of dilaurylthiodipropionate and tetrakis[methylene(3,5-di-t-butyl-4-hydroxyhydrocinnamate)]methane.

* * * * *